US008301633B2

(12) United States Patent
Cheslow

(10) Patent No.: US 8,301,633 B2
(45) Date of Patent: Oct. 30, 2012

(54) SYSTEM AND METHOD FOR SEMANTIC SEARCH

(75) Inventor: Robert D. Cheslow, Los Angeles, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 899 days.

(21) Appl. No.: 11/906,363

(22) Filed: Oct. 1, 2007

(65) Prior Publication Data

US 2009/0089277 A1 Apr. 2, 2009

(51) Int. Cl.
*G06F 7/00* (2006.01)
*G06F 17/30* (2006.01)

(52) U.S. Cl. ................ 707/739; 707/742
(58) Field of Classification Search ............. 707/4, 5, 707/102, 739, 742
See application file for complete search history.

(56) References Cited

U.S. PATENT DOCUMENTS

| 6,675,159 | B1 | 1/2004 | Lin et al. | |
| 7,139,752 | B2* | 11/2006 | Broder et al. | 707/4 |
| 7,860,706 | B2* | 12/2010 | Abir | 704/4 |
| 2009/0063472 | A1* | 3/2009 | Pell et al. | 707/5 |
| 2009/0070298 | A1* | 3/2009 | Thione et al. | 707/3 |

OTHER PUBLICATIONS

Wenhui Ma et al., "Concept Index for Document Retrieval with Peer-to-Peer Network," Eight ACIS International Conference On Software Engineering, Artificial Intelligence, Networking, and Parallel/Distributed Computing. SNPD 2007. IEEE, Pitscataway, NJ, USA, pp. 1119-1123 (Jul. 1, 2007).

* cited by examiner

*Primary Examiner* — Etienne Leroux
*Assistant Examiner* — Chelcie Daye
(74) *Attorney, Agent, or Firm* — Patrick J. S. Inouye; Krista A. Wittman

(57) ABSTRACT

Systems and methods for semantic search are provided. A corpus of information grouped into passages are indexed by semantic key terms generated from packed knowledge representations that document the semantic relationships of information within those passages. When a search is conducted, a query is similarly transformed into a packed knowledge representation that documents the semantic relationships from which semantic key terms are also generated. An inverted index relating the semantic key terms associated to the passages is searched using the semantic key terms generated from the query. A set of candidate passages is selected and refined by analysis of the semantic key terms and other information. The semantic representations associated with the set of candidate passages are then matched to the semantic representation of the query to determine a search result set.

13 Claims, 14 Drawing Sheets

SYSTEM AND METHOD FOR SEMANTIC SEARCH

FIELD

This application relates in general to information retrieval in a computer environment and, in particular, to a system and method for indexing and searching information.

BACKGROUND

Electronic data is being created and recorded in staggering amounts as our world becomes increasingly computerized. Unfortunately, finding particular data within discrete data sets becomes increasingly difficult as the amount of data grows. Efficiently searching for relevant data, whether in databases or in distributed environments such as the World Wide Web (the "Web") typically includes accessing one or more electronic indexes. In many computing environments, the index is created and maintained by commercially available database products. In the context of the Web, indexes are created and maintained by a variety of Search Engines accessible via the Internet. The challenge in most environments is keeping the indexes current—reflecting the data as the data is added, removed and updated in the environment.

Inverted indexes are a type of index used in databases and search engines for indexing many-to-many relationships. An inverted index typically consists of a plurality of records, with each record having a key and one or more associated references. Each reference indicates the presence of the key in the referenced material. For example, an index of Web pages may contain many records with a word identifier as the key and a reference to a Uniform Resource Locator ("URL") of the Web document that contains the word.

Conventional indexes typically associate index "keywords" against electronic documents. For example, the keyword "conventional" would be associated with this document if indexed by one of these conventional indexing systems. The presence of a keyword in a document, however, does not guarantee the relevance of the document to a given search. The word "conventional" may also be associated with every other document in which it has been used. With billions of documents in an ever expanding digital universe, and a limited number of words used to construct those documents, simple keyword searches are seem destined to bury relevant materials within huge piles of irrelevant materials. The problem of finding relevant materials within large datasets of irrelevant materials has long been recognized. Various approaches have been taken to refine keyword searches. For example, some calculate and use the proximity of one keyword to another in a document. Another approach is to generate statistical models associating keywords with each other.

The indexing and searching of electronic information remains one of preeminent challenges of our day. There is an unmet need for improved systems and methods for generating useful indexes and efficiently searching those indexes to find relevant materials.

SUMMARY

A method and system for the semantic search of information is provided. Semantic index key terms are generated for information passages. The index key terms include one or more index key tokens generated by a rules-based transform component. The index key tokens include a representation of a semantic relationship found in the information passage. A token type and other information may be appended to the index key token to describe the semantic relation. The index terms are indexed by an index inversion process such that the semantic index terms are associated with information passages relevant to the semantic relationship documented by the semantic index key term. The resulting inverted index is available for a search phase included in other embodiments of the invention.

The search phase generates one or more query key terms that include one or more query key tokens generated by a rules-based transform component. The query key tokens include a representation of a semantic relationship found in a search query, for example, a natural language text string. The query key term transform component may be identical, or similar to, the index key term transform component. The semantic relationships and concepts indexed by the index key terms are then queried against the inverted index using a subset of the semantic relationships and concepts of the query, as documented by the query search key terms. A set of passages matching the query key terms may be returned as a result set or further processed.

Both the index key terms and the query key terms may be generated directly or with reference to packed knowledge representations that document the semantic relationships of information within passages, and similar packed knowledge representations that document the semantic relationships of information within queries. The semantic representation of the passage may be matched with the semantic representation of the query using a unification process before including a passage in the result set.

Another embodiment of the invention processes a candidate retrieval set to select likely-relevant passages before incurring the computationally-expensive matching of semantic representations. A candidate retrieval system and method reviews candidate passages by the analysis of key terms and tokens. For example, a relevance score may be used to quantify the likely relevance of a passage depending the presence and types of key tokens. The candidate retrieval system and method may include candidate selectors, for example, filters, that select the candidates to forward to match systems and methods. Heuristic systems and methods may monitor and refine the candidate selection process. The match system and method compares semantic representations of match candidates identified by the candidate retrieval system and method with the semantic representation of the query. The match system and methods may also by heuristic systems and methods to monitor and refine the match selection process.

Embodiments of the invention may be implemented either by a discrete computer system or in a distributed system. For example, the semantic indexing may be performed by a first system, the index placed on accessible storage administered by a second system, the processing of the query into query key terms by a third system, the selection of candidate passages by a fourth system, the match of candidate passages by a fifth system and the organization of a search result by a sixth system, or any other permutation or combination permitted by the distributed system.

Still other embodiments will become readily apparent to those skilled in the art, including known substitutions, alternative code structures or hardware encompassing the claimed methods and systems or any other modification to the details of the embodiments that do not depart from the spirit and the scope of the claims. Accordingly, the drawings and full content of this specification are to be regarded as illustrative in nature and not as restrictively representing the only embodiments that the claims are intended to encompass.

DETAILED DESCRIPTION

Exemplary Computer System and Network

Figure 1:
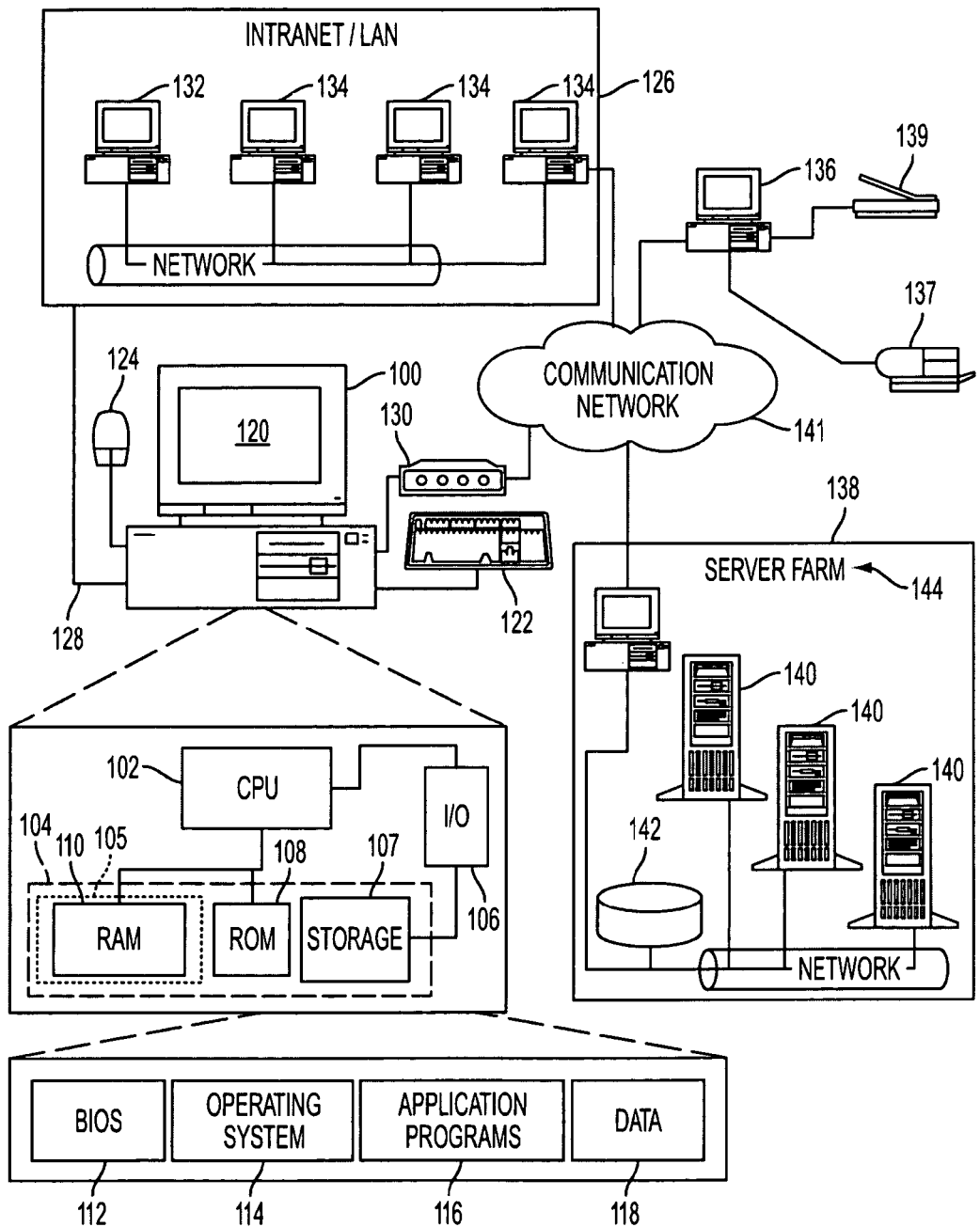
FIG. 1 is a block diagram of an exemplary computer system.

The block diagram shown in FIG. 1 illustrates an exemplary computer system. A computer 100 includes a central processing unit (CPU) 102, a system memory 104, and input/output (I/O) ports 106.

The system memory 104 includes working memory 105 and storage memory 107. The working memory 105 is generally addressable by the central processing unit (CPU) 102 and includes random access memory (RAM) 110. The CPU 102 can read from and write to RAM 110 at or near bus speeds. The CPU 102 can also read from, but not write to, read-only memory ROM (108), which is generally used to provide the CPU with very fast access to non-volatile information required at start-up or during operation of the computer 100.

Storage memory 107 includes memory that is generally not directly addressable by the CPU, and is thus not available to be acted upon by processor instruction performed by the CPU 102 without an intervening transfer of the information stored in the storage memory 107 to the working memory 105. The storage memory 107 is operably connected to the working memory 105, generally via an input/output bus (I/O) 106, such that information stored in the storage memory 107 can be transferred to the working memory 105.

The system memory 104 contains a basic input/output system (BIOS) 112 for administering the basic input and output between components of the computer, an operating system 114 for providing the basic software services provided by the computer and application programs 116 that provide the functionality for performing specific tasks with the computer. Data may be stored and manipulated in the system memory 104 by any of the BIOS 112, operating system 114 and application programs 116.

The computer 100 has a display 120 for output of information and input devices, such as a keyboard 122, or a pointer device, such as a mouse 124. Peripheral devices such as a scanner 139 or printer 137 may be attached to a computer 136 to extend the computer's abilities. Suitable computers include conventional mainframe computers, server computers, personal computers, notebook computers, handheld computers, personal digital assistants, personal information managers, and hybrid devices incorporating computer capabilities, such as cable boxes, cellular telephones, and pagers.

The computer may be connected to a local area network (LAN or intranet) 126 through a network connector 128 or through a modem 130. A LAN 126 includes a server computer 132 and a plurality of client computers 134, which are all functionally similar to computer 100. The computer 100 or the LAN 126 may be connected to other computers 136 or other networks 138 through a communication network 141 to form a wide area network (WAN). The Internet is an example of a large scale WAN that connects together many computers 100.

Server computers 140 (functionally similar to computer 100 but generally more powerful) store application programs 116 and data 118 that are communicated to other computers for instance, 100, 134 and 136, connected to a network. In some cases, server computers 140 are interconnected to form parallel processing networks. These networks are designed to process applications concurrently by dividing tasks among the various server computers and combining results. The dividing, processing and combining of results may be accomplished many times while an application runs.

Exemplary Search Environment

A typical search environment can consist of large numbers of electronic documents all or any part of which may be defined as a corpus. An electronic document, Web document or simply, "document," includes a grouping of electronic data. A document is a grouping of electronic data partitioned from the corpus at any level. For instance, a document may comprise a complete Web site, a page, a paragraph, a clause, a sentence, an abstract or any granularity or combination of electronic information drawn from the corpus.

As used herein, discussion of a key, key identifier, key ID, key reference, passage, passage ID, passage reference term, term identifier, term ID, term reference or similar language should be considered to be interchangeable in the various embodiments unless otherwise specifically limited. The same breadth should be given the discussion of references, reference identifiers, reference ID, documents, document identifiers, document ID or similar language, since use of literals or identifiers may be considered a question of memory efficiency and speed rather than a requirement of any method or system described.

One commonly indexed domain is the Web. The Web includes many billions of electronic documents or "Web documents", each of which represents a grouping of data identified by a Uniform Resource Locator ("URL"). The URL of a Web document often serves as its document identifier. A Web document often includes data and meta-data. Meta-data provides information that describes the data and may include formatting information, for example, HTML or information that identifies data, for example, XML. While many electronic documents are being standardized around the formats associated with the Web, many other documents are stored in proprietary formats. As described herein, the example document contains terms including words or phrases. However, any type of information that lends itself to being indexed is intended.

A subset of documents is defined to be included in an index, such as all electronic documents accessible to a firm's internal network. A separate or combined index may define all electronic documents accessible via the Web. An index, therefore, has a domain that includes the documents indexed and the type of information indexed. Typically, the index includes a plurality of key values that are used to "look up" references associated with that key value. In the context of terms within a document, each document in the corpus of documents is parsed for terms. If a term is contained in the document, the index should reference that document when the term is queried.

Overview of Semantic Search

Semantic search systems index and retrieve information based upon the ascertained meaning of information passages contained in a corpus of information. In the case of written language, words are analyzed in context, with understanding given to accepted meaning and grammar. This semantic analysis is preformed by natural language understanding programs that create complex and often copious data structures that set forth the semantic relationships found in the analyzed data. At search time, natural language queries are translated into similar data structures. Relevant data is retrieved from the corpus of information by comparing the data structures generated for the query against the data structures generated for the information passages. Each of these comparisons is computationally expensive in terms of the relative amount of computer resources that are required to perform each comparison. Efficient and accurate methods and systems that pre-select data structures that are likely to be relevant to the query would be highly desirable given the large amount of data included in each data structure and the potentially enormous number of data structures that must be generated to index a corpus of information.

Supporting methods and systems for semantic search are described in co-pending and commonly assigned U.S. Pat. No. 7,313,515, issued on Dec. 25, 2007, to Crouch et al., the disclosure of which is incorporated by reference.

For the purpose of simplifying the description to follow, the methods and systems of the present invention are described in three phases. The methods employed or components described within these phases are not intended to suggest or imply that they can or do occur only in that phase. To the contrary, it will be apparent that some of the systems and methods described are used in several of the phases and no limitation to their use is intended. The present invention also includes heuristic tuners that may adjust the performance of methods or systems described in other phases through the use of learning and feedback mechanisms.

The three phases include an indexing phase, a retrieval phase and a match phase. Broadly grouped to simplify the following discussion, during the indexing phase a corpus of information is parsed and translated into semantic representations. These semantic representations are generally stored as data structures in a database for use in later comparison with semantic representations generated for search queries. A pre-selection of the semantic representations to be compared against the semantic representation of a search query is preformed in the retrieval phase. These pre-selected "candidate" semantic representations are matched against the semantic representation of the search query in a match phase.

Information may be grouped in passages of varying granularity. A passage may be of any granularity that gives context to its contents. For example, a passage might encompass a document, a section, a chapter, a paragraph, a sentence or a phrase. In general, the more information contained in a passage, the larger a semantic representation would be for that passage. The examples below will assume that a passage represents a short sentence in order to keep the discussion to a manageable length without obscuring the described methods and systems. However, those methods and systems are similarly applicable to passages having more or less information contained within them.

Indexing Phase

Figure 2:
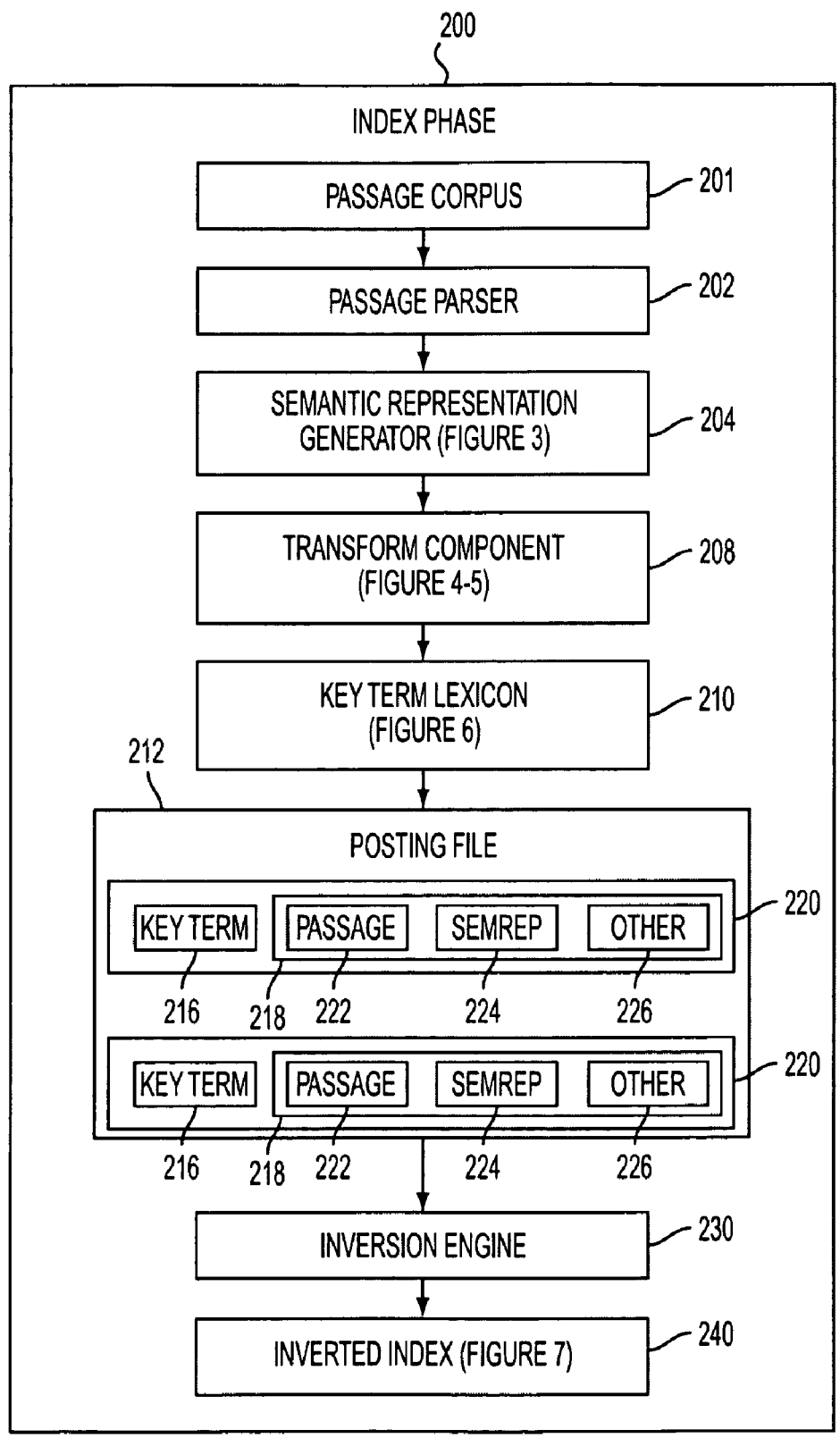
FIG. 2 is a block diagram of an exemplary indexing phase.

Turning to FIG. 2, an indexing phase 200 indexes a corpus of passages 201 by obtaining each passage and forwarding the passage to a passage parser 202. The passage parser 202 parses the passage into a data structure referred to as an f-structure. In an embodiment, the passage parser 202 is the Xerox Linguistic Environment (XLE), available from Xerox PARC of Palo Alto, Calif. A semantic representation generator 204 generates a packed knowledge representation, one form of which is referred to below as semantic representations. The semantic representation generator 204 may include functions for analyzing the content and structure of the passage, accessing and applying linguistic resources such as an ontology, documenting potential ambiguity in the interpretation of passages, applying rewrite rules to structure and writing the semantic representation.

The semantic representation is then transformed into key terms by a transform component 208. Each key term is associated with a unique identifier and stored in a key term lexicon 210. The key terms generated from the transformation of the semantic representation are then associated with a reference to the source passage and stored in a posting file 212. For storage efficiency, unique identifiers associated with the key terms, passages and semantic representations are generally associated in the posting files, but the actual information may be stored as part of the posting file 212. Descriptions of the key terms, semantic representations, and passages should be read to include either references to those values or the actual values themselves.

The posting file 212 includes a plurality of postings 220. Each posting 220 includes a key term 216 that is associated with a reference 218. The reference 218 associates the passage or information derived from the passage with the key term 216. For example, a posting 220 might include a reference to the source passage 222, a reference to the semantic representation ("SemRep") 224 derived from that semantic representation or any other useful information 226, such as a data path or link to a source document containing the passage.

Once the posting file 212 is populated with postings 220, an inversion engine 230 creates an index 240 that associates each unique key term 216 with each of the references 218 that are associated with that key term 216 by way of a posting 220. Any index inversion method or system presently known or developed in the future may be used to create the inverted index. One particularly advantageous inversion method is described in a co-pending and commonly-assigned U.S. Patent Application Publication No. 2008/0154938, published Jun. 26, 2008, pending, which is incorporated herein in its entirety by this reference.

Figure 3:
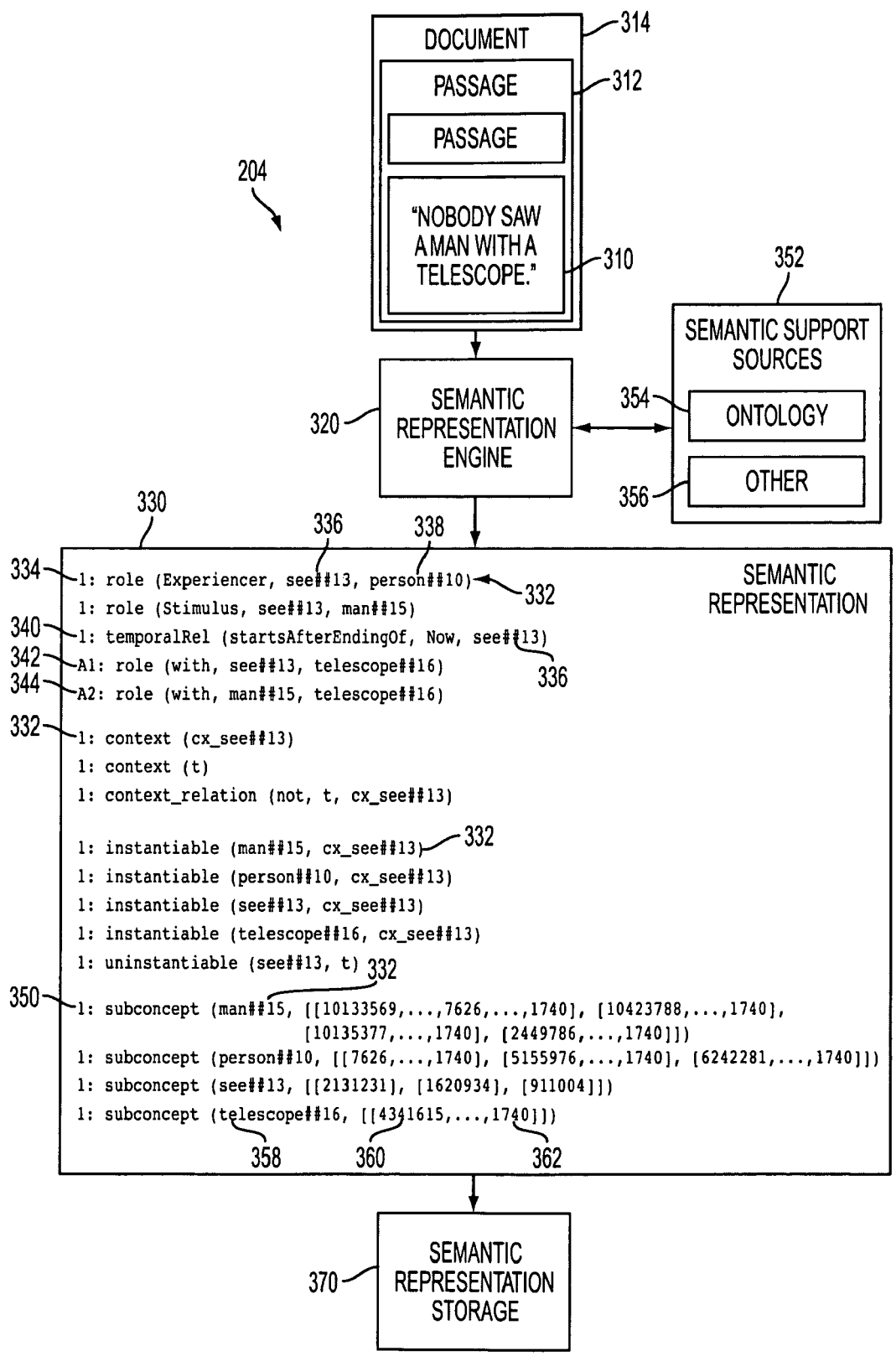
FIG. 3 is a block diagram illustrating an exemplary generation of a semantic representation.

FIG. 3 illustrates an exemplary semantic representation generator 204 in more detail. A passage 310 is obtained for processing by a semantic representation engine 320. The passage 310 represents a granularity of information which may be contained as part of another passage 312, which itself might belong to a document 314 or other form of a container passage. For example, the passage 310 is the sentence "nobody saw a man with a telescope". This sentence might be contained within a paragraph 312 that exists within a document 314. The passage 310 might just as well represent a phrase within the sentence.

A semantic representation 330 is generated by the semantic representation engine 320. The semantic representation engine 320 includes functions for analyzing the content and structure of the passage 310, accessing and applying linguistic resources such as an ontology, documenting potential ambiguity in the interpretation of passage 310 and applying rewrite rules to structure and write the semantic representation 330. The semantic representation engine 320 transforms the passage 310 by rules into a logical representation of a conceptual meaning of language. The resulting packed knowledge representation documents deep semantic relationships. For example, the semantic representation 330 illustrated in FIG. 3 is a packed knowledge representation of the sample passage 310 "Nobody saw a man with a telescope." The semantic representation 330 includes a plurality of substructures 332 that include a semantic analysis of the passage 310.

Differing types of substructures 332 are used to the document different semantic relationships. For example, a role relationship substructure 334 associates a seeing event (labeled as see##13) 336 with a person object (labeled as person##10) 338. A temporal relationship substructure 340 recognizes and records the seeing event 336 as having occurred before now. Some substructures 332 document alternative understandings when the passage 310 is ambiguous. The example sentence "Nobody saw a man with a telescope" can be interpreted either that a man was seen with a telescope, as recorded by substructure 342 (alternative "A1") or that a man was seen using a telescope 344, as recorded by substructure 344 (alternative "A2").

Other substructures 350 may document lexical relationships drawn from semantic support resources 352 such as an ontology 354 or other sources 356, such as a grammar rules database. WordNet, created and maintained by the Cognitive Science Laboratory of Princeton University, is a semantic lexicon of the English language and is one example of an ontology. WordNet groups words into sets of synonyms called synsets. The synsets may be organized into hierarchies specifying the relationships between words. For instance, hypernyms are more general words associated with the subject words or hyponyms are more specific words associated with the subject. The semantic representation engine 320 may draw from, interpret or modify the information from the synsets to populate substructures 350 of sub concepts. For example, the concept of a telescope 358 may be associated with progressively more general terms such as a looking glass (ID 4341615) 360 or a physical object (ID 1740) 362. Similarly, the semantic representation engine 320 may omit terms in the substructure 350 that are too general to be of practical use in a search, such as discarding the term "physical object" (ID1740) 362. The semantic representation engine 320 is further described in Crouch, referenced and incorporated above.

The semantic representations 330 generated by the semantic representation generator 204 are stored in a semantic representation database 370, where they may be associated with a unique identifier and a reference to their source passage. In addition to storage in a database, a semantic representation may be stored in any form of volatile or non-volatile memory, or generated as needed.

Figure 4:
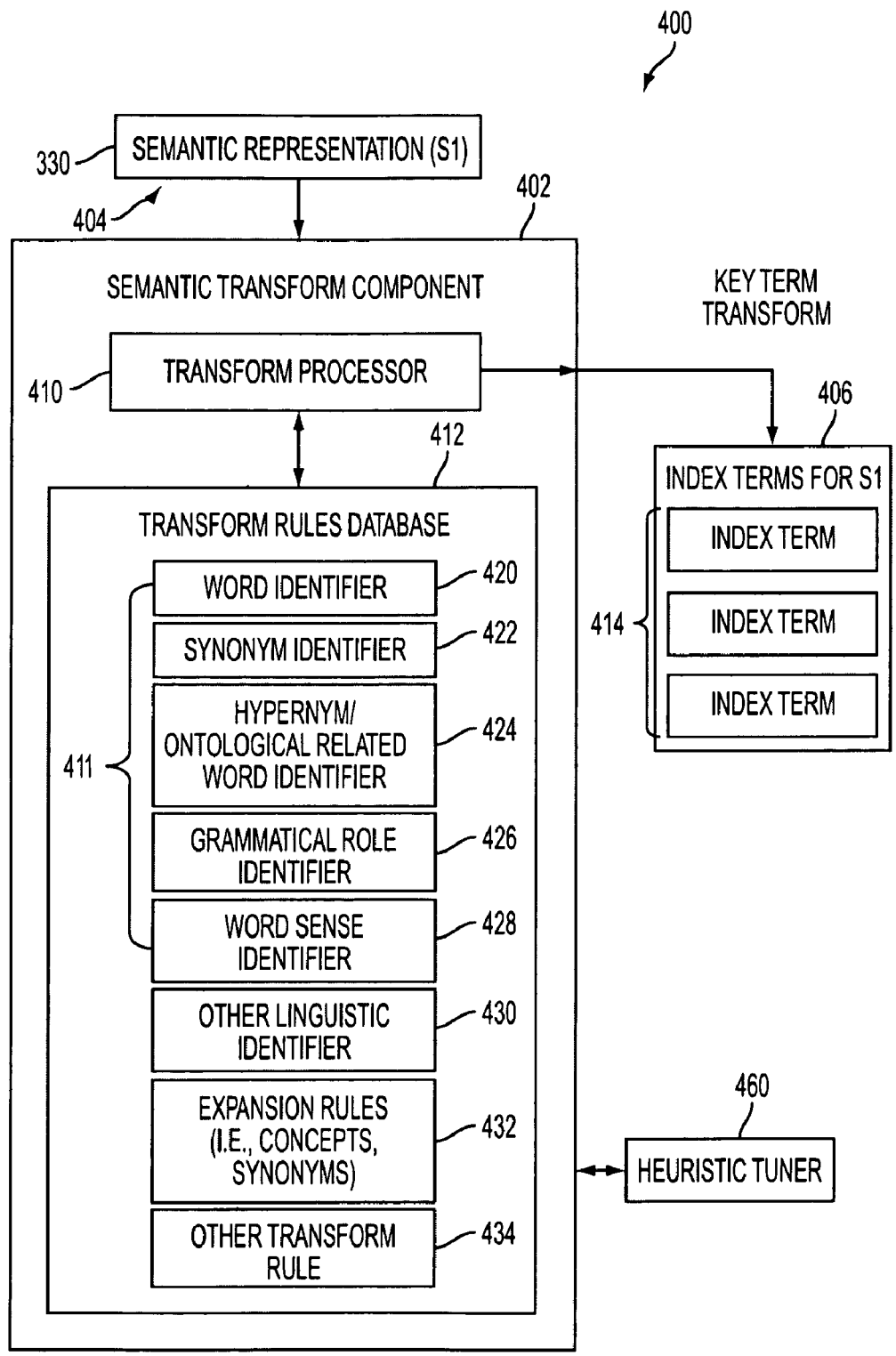
FIG. 4 is a block diagram illustrating an exemplary transformation of a semantic representation to index terms.

In FIG. 4, the transformation 400 of information into key terms is illustrated. A semantic transform component 402 obtains a packed knowledge representation 404 of an information passage for processing into index terms 406. In an embodiment, the packed knowledge representation 404 is a semantic representation 330, such as the one shown in FIG. 3. In another embodiment, the packed knowledge representation 404 is generated by the semantic transform component 402 through its own interpretive routines, direct usage of semantic resources such as an ontology, or the like.

The semantic transform component 402 includes a rules-based transform processor 410 that draws transform rules 411 from a transform rules database 412. One or more key index terms 414 is produced to point to the semantic representation 330 and to provide an index path to the subject passage. Due to subtleties in the creation of the semantic representations and issues with linguistic resources, among other reasons, relevant passages may not always have index key terms that align in predicable ways with the query key terms generated from a query. To improve the relevance of key terms over time, a heuristic tuner component 460 interface with metrics determined in either or both of the retrieval or match phases to tune the transform rules 411. The rules are also tuned based upon empirical observations of metrics such as search success.

Transform rules 411 are stored in the transform rules database 412 such that they may be added, deleted or edited over time to improve performance. Examples of transform rules include: rules to identify and index particular terms 420, like proper names; identify and extract synonyms to the terms used in the passage or query 422; identify and extract hypernyms to the actual terms used in the passage or query 424; identify and associate the grammatical role of terms in the passage 426; identify and associate the word sense of the term 428; or associate any other linguistic identifier 430, such as those that might be available from an ontology or other linguistic resource. A transform rule 411 may also cause the generation of index terms 414 based on other than strictly linguistic information. For example, expansion rules 432 could generate key terms based on logical associations, such as substituting nicknames for entities ("Big Blue" for "IBM") or colloquialisms for more formal terms. Other transform rules 434 are expected to be developed as the heuristics are analyzed and experience develops.

Figure 5:
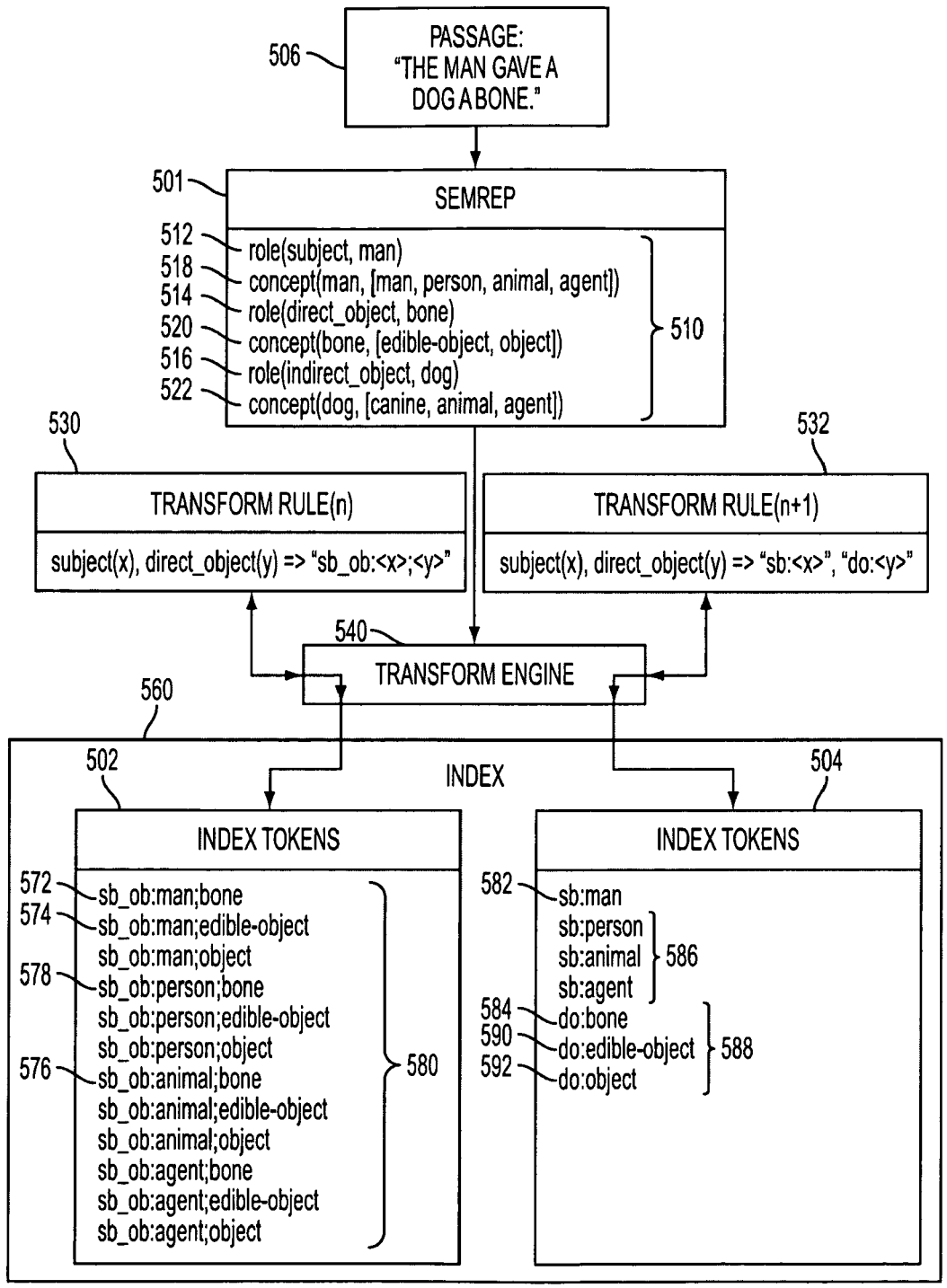
FIG. 5 is an exemplary transform of a passage to index terms.

An example of the generation of index key tokens 502-504 for a sample passage 506 is illustrated in FIG. 5. The sample passage 506 is "the man gave a dog a bone." This sentence is translated to a semantic representation 501, which includes a number of substructures 510. The substructures 510 set forth a semantic analysis of the sample passage 506. So as not to obscure the explanation, only a few of the possible substructures 510 are illustrated. The substructures 510 illustrates document semantic "roles" and "concepts" from among many other possible semantic relationships. For example, "man" is recognized in one substructure 512 as the subject of the sentence, a second substructure 514 documents the direct object of the sentence as "bone" and a third substructure 516 identifies the "dog" as the indirect object of the sentence. The "concept" substructures 518-522 expand these objects into lists of related concepts, in this case organized as sets of hypernyms, or progressively more general synonyms for the term. For example, the concept of a "man" might otherwise be described in a concept substructure 518 as a "person," an "animal," or an "agent." The same type of expansion is possible for a "bone" concept substructure 520 or a concept substructure 522 for "dog."

Two of the many possible transform rules 520-532 are shown in FIG. 5. These transform rules 530 are used by transform engine 540 to generate index key tokens 502-504. The examples provided for these transform rules 530-532 take the form of rewrite rules. These rewrite rules translate and format information from the substructures 510 into index terms that can be used as unique keys in an index file 560. The same substructures 510 can serve as the input for multiple transform rules 530-532, which produce different index key tokens 502-504 from the same information.

A transform rule 530 presents the example "subject(x), direct_object(y)=>"sb_ob:<x>;<y>", which retrieves the subject and direct_object substructures from the semantic representation 501 and writes the information to a canonical form. The index token includes a label or token type and the subject information retrieved from the substructures. Examples of a resulting index token or index term is "sb_ob: man;bone" 572, which includes the term type "sb_ob" the subject information "man" and the direct object information "bone". The transform engine 540 may also process an expansion of transform rule 530 by generating index tokens for concepts related to the subject/direct object semantic relation by referencing the concept substructures 518-522 of the semantic representation 501. For example, other key index tokens 574-576 may be generated like "sb_ob:man; edible-object" as an expansion for "bone", or similarly "sb_ob:animal;bone" as an expansion for "man". Other expanded index tokens 580 are illustrated in FIG. 5 for this simplified example.

Alternative index key terms for the passage 506 may be advantageously indexed to provide alternate paths to the same passage 506 via different path. Transform rule 532 is an example that rewrites the subject/object relationship into index tokens 504 that less specifically define the relationships between the information but still represent the grammar of the sentence. For example, "subject(x), direct_object(y)=>"sb:<x>", "do;<y>", results in separate key index tokens "sb:man" 582 and "do:bone" 584 and their various expansions 586-588. The transform engine 540 may also process the substructures 510 to control or otherwise filter the generation of index key tokens 502-504. For example, the transform engine 540 could determine the semantic distance between related terms and limit the expansion. The semantic distance between terms may be indicated in a list by the order of that list, with the first terms more closely related than the later terms in the list. The transform engine 540, in this example, may generate a key token 590 relating "edible-object" to "bone", while omitting key token 592 expansion of "bone" to "object" as being too general to be of use during a search.

One or more of the index key tokens 502-504 are combined to form an index key term 560. One or more index key terms 560 may be created for each information passage.

Figure 6:
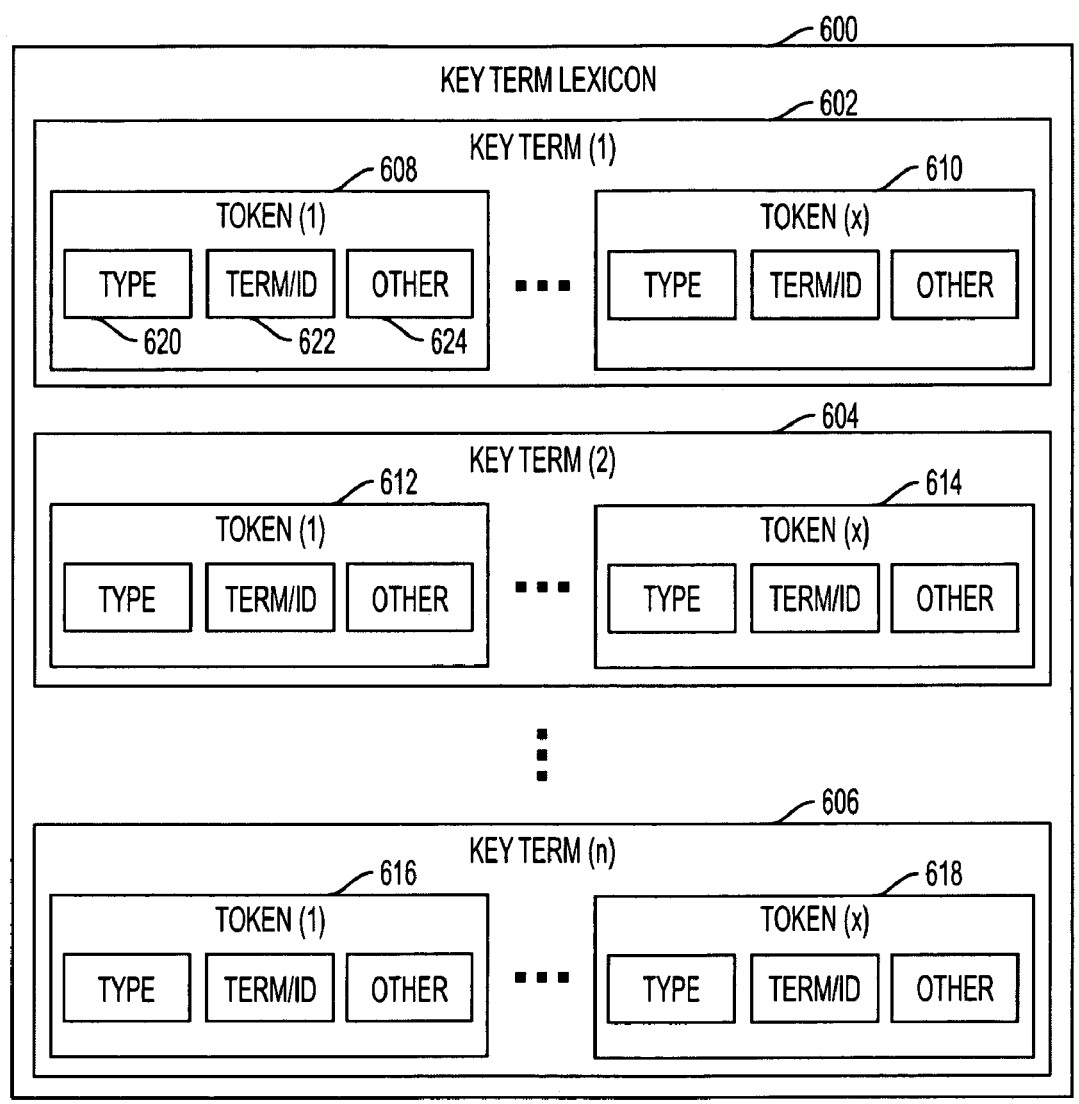
FIG. 6 is a block diagram of an exemplary key term lexicon.

A key term lexicon 600 is shown in FIG. 6 and includes a plurality of key terms 606. The key term lexicon 600 is a database that associates "index terms" to unique identifiers, which are pointers into the postings database. In other words, given an index term, the lexicon can return an address to the postings for that term. The "postings" for a term refers to the occurrence data—all of the documents, sentences, or sub-sentential components in which the term occurs.

Index terms 602-606 are strings that encode a representation of a word in the original document. The term may contain the actual word string itself, or the string of a word that is linguistically related to the word (e.g. a synonym, hypernym, or hyponym) 622. It may also (or instead) contain an identifier (a lookup key) from a lexical resource (a dictionary or ontology) representing the word or some related word.

In addition, the index term may contain linguistic information about how the word is being used in the sentence 624. This information may contain the part of speech (e.g. noun, verb, or adjective), the grammatical role the word plays (e.g. subject, direct object, or indirect object), and the relationship of the index term to the original word (if it is a synonym, hypernym, hyponym, etc).

All of this information is stored in the index term 604 by concatenating the different string or character encoding into a single string, separated by suitable delimiters. For example, the word "man" in the original document, used as a noun, serving as a direct object, might be encoded into an index term as "man:VB:N:DO", where "man" is the original word, "VB" denotes that the string is the word verbatim (as it appears in the original document), the "N" denotes that it is a noun, and "DO" denotes that it serves as a direct object in the sentence.

Another index term 606 might be added with a hypernym of this word, say "person", yielding the index term "person: VB:N:DO". Alternatively, the word "man" might be associated with a lookup key of "1234" in some particular lexical resource, and the index term might then be encoded as "1234:ID:N:DO", where the "ID" denotes that "1234" is a lookup identifier for a particular lexical resource.

In an embodiment, each key term 602-606 is a unique string that includes one or more tokens 608-618. A token 608-618 includes a type field 620, a term or term identifier 622 and an other field 624 available for the association of related data or meta-data, such as the storage of metrics for heuristic tuning. Examples of tokens 608-618 include the index key tokens 502-504 shown in FIG. 5, which may be used individually for a key term 602 or in various combinations to form unique strings appropriate for an index key.

Figure 7:
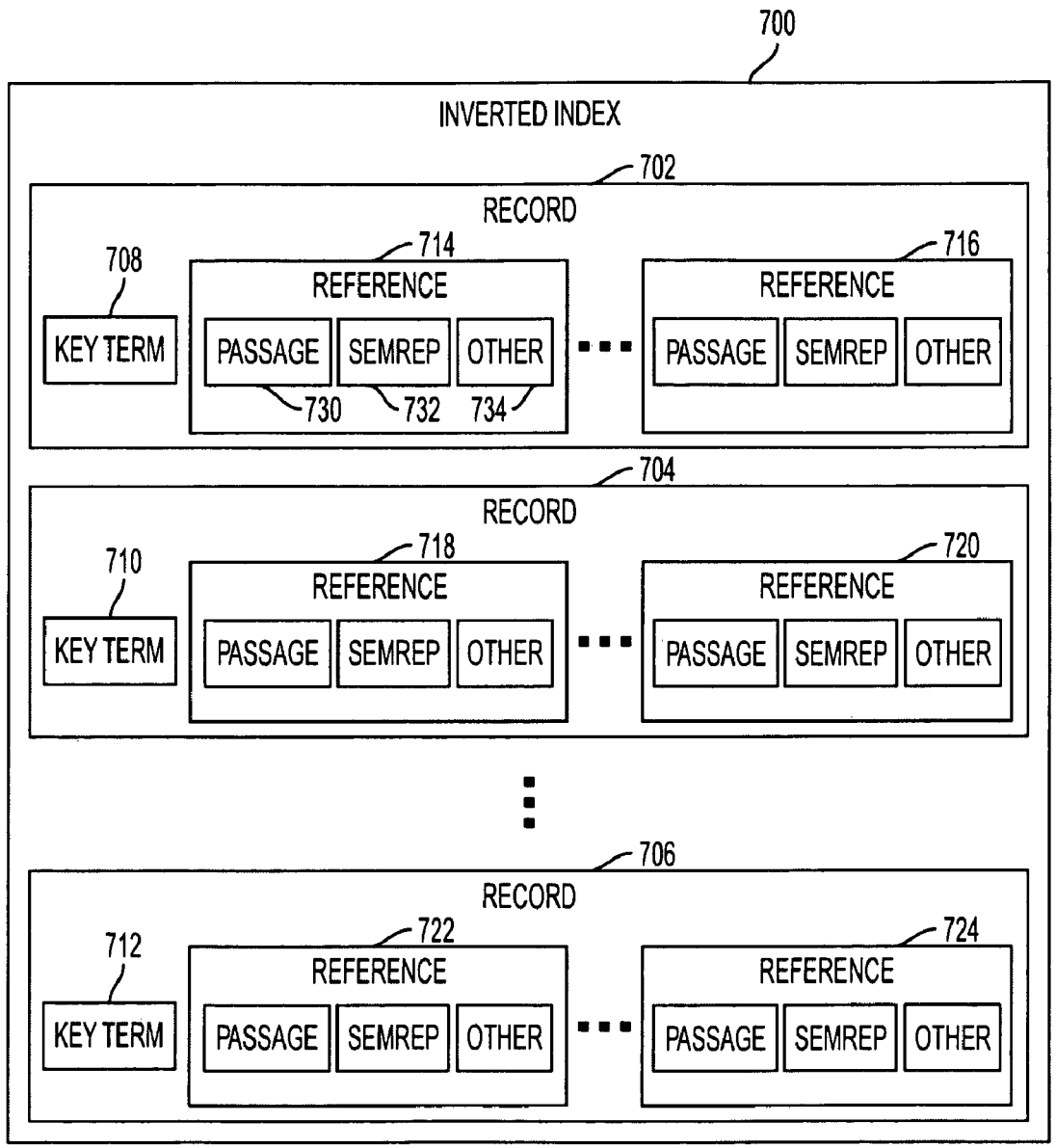
FIG. 7 is a block diagram of an exemplary inverted index.

Referring to FIG. 7, an inverted index 700 contains a plurality of records or "postings" 702-706. Each record represents an index entry with a key term 708-712 that is associated with one or more references 714-724. A reference includes a passage field 730, a semantic representation field 732, or identifiers associated with either or both. Other information 734 may also be associated with the record, such as a link to a source document or the location of an associated passage. In an embodiment, the semantic representation field 732 stores an identifier used to retrieve an associated semantic representation 330 from the semantic representation database 370 (FIG. 3). The passage, or reference to the passage, can be obtained from the associated passage field 730. The passage reference may also be associated with the semantic representation 330 stored in the semantic representation database 370.

Search Phase

Passages relevant to a query are identified and returned in a search phase. For the purposes of organizing the following discussion, the search phase includes a retrieval phase and a match phase. Candidate passages are identified in the retrieval phase using key index terms generated for a query in a manner comparable to the generation of key index terms for a passage. A set of candidate passages is determined by way of relevance assessment and heuristic tuning based in part upon the type and matching of key terms generated for both the query and the passage. The match phase includes the relatively more computationally expensive matching of the semantic representation of candidate passages against the semantic representation of the query. The search phase returns references to the passages found to be relevant to the query. As used herein, a reference to a passage may include the actual passage.

Retrieval Phase

Figure 8:
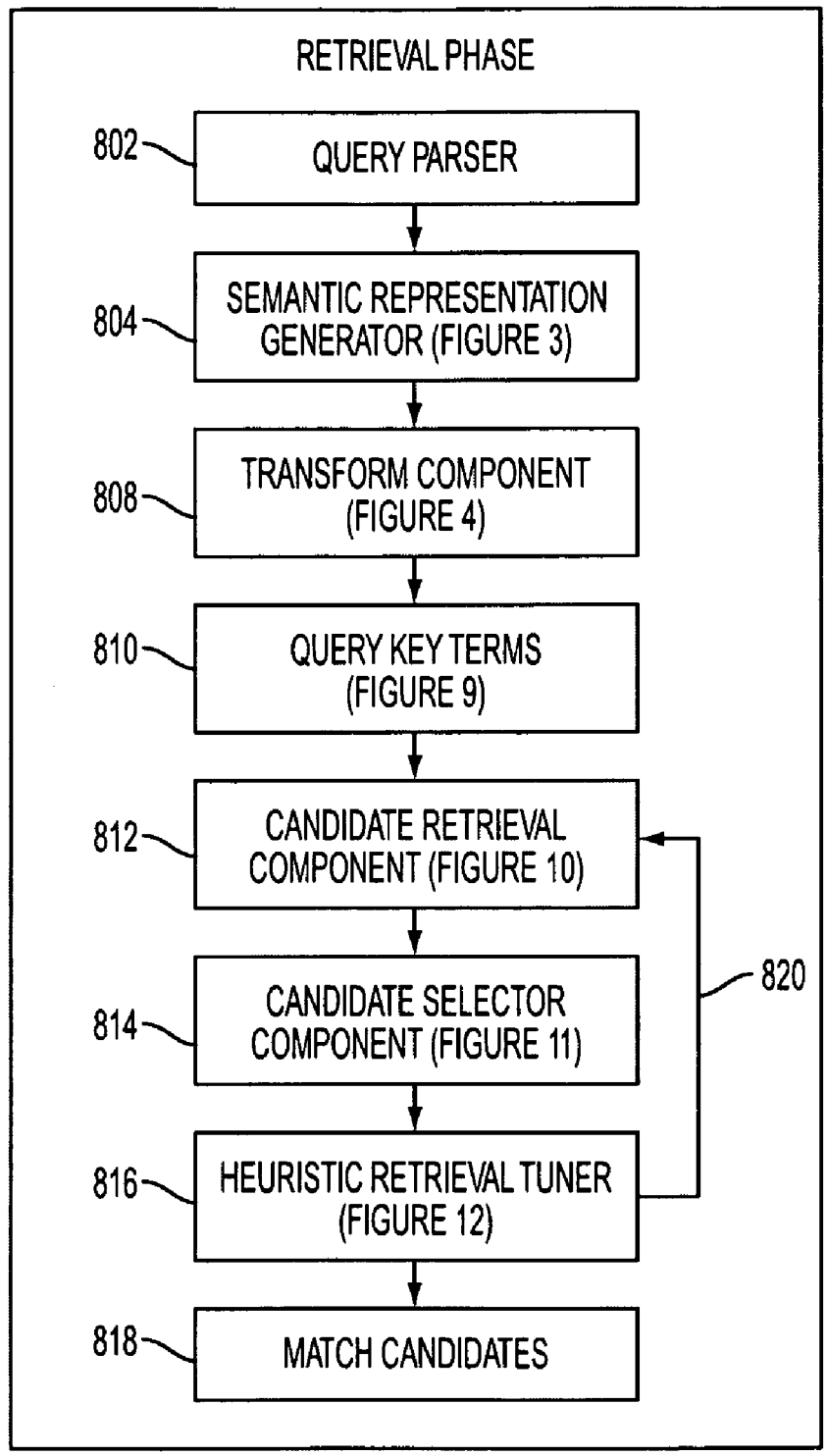
FIG. 8 is a block diagram illustrating an exemplary retrieval phase.

An exemplary retrieval phase is illustrated beginning with FIG. 8. A query is provided to form the basis of a search. A query parser 802 obtains and parses the query. In an embodiment, the query parser 802 uses Xerox Linguistic Environment (XLE), to generate an f-structure. A semantic representation generator 804 generates a packed knowledge representations of the query. One form of a packed knowledge representation is referred to as a "semantic representation." The semantic representation generator 804 may include functions for analyzing the content and structure of the query, accessing and applying linguistic resources such as an ontology, documenting potential ambiguity in the interpretation of query, and applying rewrite rules to structure and write the semantic representation.

The exemplary semantic representation generator 204 (FIG. 3) may be used for the generation of both semantic references for passages and for the query. For example, the semantic representation generator 204 may operate on a server computer 140 accessible to either or both the indexing and search phases. While use of the same semantic representation generator 204 may more consistently translate both passages and queries, implying a greater chance of matches, the same semantic representation generator need not be used for generating both passage and query semantic representations. For example, a semantic representation generator 804 may be alternatively configured to process a query with different rules or emphasis than is used for passages.

The semantic representation of the query is then transformed into key terms by a key term transform component 808. The generation of key terms is discussed above with reference to FIG. 4. Like the semantic representation generator 204, the key term transform component 808 may be stored on a server computer for use by either or both indexing and retrieval phases. Alternatively, the key term transform component 808 may be specially configured to process queries. As the key terms are generated, the term lexicon 600 (FIG. 6) is accessed and the key term is added to the term lexicon if it is not already present. A set of key terms 810, generated from the query, is then provided to a candidate retrieval component 812. At query time, the index terms that are generated from the semantic representation of the query are looked up in the inverted index/postings. Thus, the occurrence information (where each term occurs in the corpus) can be retrieved for each index term in the query. By performing set operations on the occurrence information, the search engine can find only those documents that contain, for example, at least one instance of some variant of each term in the query. For example, if the index terms from the query include "man:VB: N:DO" and "person:VB:N:DO", both of these terms are looked up in the lexicon, and the postings are retrieved for both of them. The union of the occurrences for both of these terms represent all documents (or sentences, or sub-sentential components) that contain either representation for this particular word. This set can then be intersected with postings retrieved for other terms to find documents (or sentences, etc) that contain some variant of all terms in the query.

The candidate retrieval component 812 determines a set of retrieval candidates by performing set operations and assigning relevance scores to passages. The retrieval candidates are then provided to a candidate selector component 814, which filters and appraises the retrieval candidates to produce a potential match candidate set. A heuristic retrieval tuner 816 appraises the potential match candidate set and either provides the match candidate set 818 for the match phase or iteratively performs candidate retrieval 812-816 until an acceptable set of match candidates 818 is identified.

Figure 9:
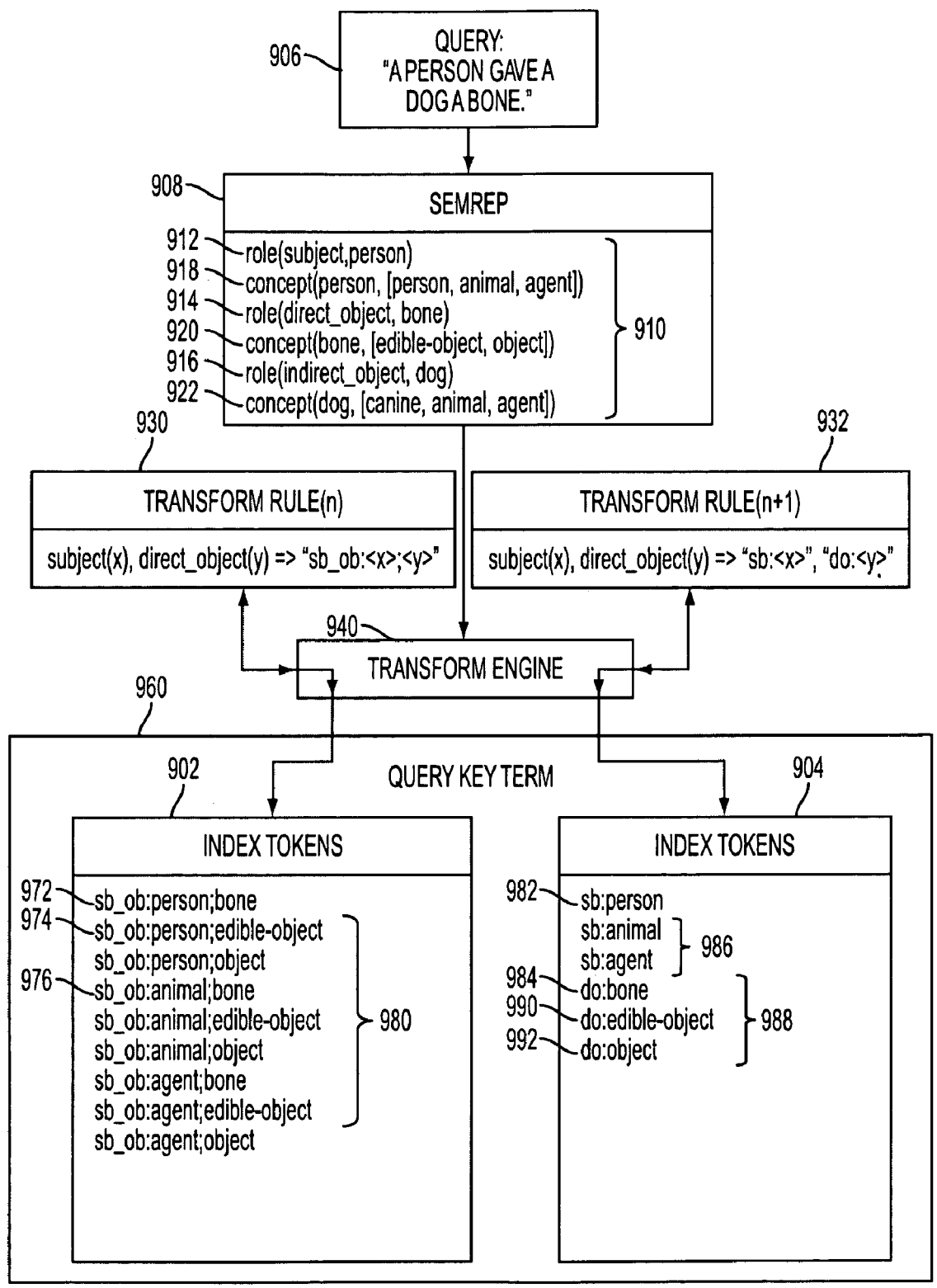
FIG. 9 is a block diagram illustrating an exemplary transform of a query to index terms.

An example of the generation of query key tokens 902-904 for a query 906 is illustrated in FIG. 9. In this simplified example, the query 906 "A person gave a dog a bone" is intended as a search for the sample passage 506 "A man gave a dog a bone." The sample query 906 does not duplicate the sample passage 506, but rather expresses a similar semantic premise. The sample query is translated to a semantic representation 908 that includes a number of substructures 910. The substructures 910 set forth a semantic analysis of the sample query 906. From the many possible semantic relationships, the substructures 910 are again limited to "roles" and "concepts" in order to demonstrate possible alignment of some of the key index key tokens 502-504 associated with the passage 506 and the key query key tokens 902-904 associated with the query 906. In the query, "person" is recognized in one substructure 912 as the subject of the example sentence, a second substructure 914 documents that the direct object of the sentence is "bone" and a third substructure 916 identifies the "dog" as the indirect object of the sentence. The "concept" substructures expand these objects into lists of related concepts, in this case organized as sets of hypernyms, or progressively more general synonym for the term. It might be helpful to note that the expansion 518 of the term "man" from the passage yielded an index term 578 equivalent to an index term 972 generated for the subject of the sample query 906.

In order to more easily demonstrate the possible alignment of key index terms, the transform rules 930-932 are the same transform rules 530-532 used to transform the sample passage 506. These transform rules 930-932 are used by transform engine 940 to generate query key tokens 902-904. The transform rules 930-932, for example, are rewrite rules that translate and format information from the substructures 910 into index terms that can be used as unique keys for querying against the index file 700. As indicated by the example transform rules, the same substructures 910 can serve as the input for multiple transform rules 930-932 that produce different query key tokens 902-904 from the same semantic relationships. One or more of the query key tokens 902-904 are combined to form an query key term 960. One or more index key terms 960 may be created for each query.

A transform rule 930 presents the example "subject(x), direct_object(y)=>"sb_ob:<x>;<y>"". This example transform rule retrieves subject and direct object substructures from the semantic representation 908 and writes the information into a canonical form. Each key token includes a label or token type and the subject information retrieved from the substructures. Examples of a resulting index token is "sb_ob: person;bone" 972, which includes the term type "sb_ob" the subject information "person" and the direct object information "bone". The transform engine 940 may also process an expansion of transform rule 930 by generating index terms for concepts related to the subject/direct object semantic relation by referencing the concept substructures 918-922 of the semantic representation 908. For example, key index tokens 974-976 may be generated as "sb_ob:person; edible-object" as an expansion for "bone", or similarly "sb_ob:animal;bone" as an expansion for "person". Other expanded index tokens 980 are illustrated in FIG. 9 for this simplified example.

Alternative index terms for related information may be advantageously generated for the query to improve the chances of a match with relevant indexed passages. Transform rule 932 is an example that rewrites the subject/object relationship into index tokens 904 that less specifically define the relation between the information but still indicates the grammar of the sentence. For example, "subject(x), direct_object(y)=>"sb:<x>", "do;<y>"", results in separate key index tokens "sb:person" 982 and "do:bone" 984 and their various expansions 986-988. The transform engine 940 may also process the substructures 910 to control or otherwise filter the generation of key tokens 902-904. For example, the transform engine 940 could determine the semantic distance between related terms and limit the expansion. The semantic distance between terms may be indicated in a list by the order of that list, with the first terms more closely related than the later terms in the list. The transform engine 940, in this example, may generate a key token 990 relating "edible-object" to "bone", while omitting the key token 992 expansion of "bone" to "object" as being too general to be of use during a search.

Figure 10:
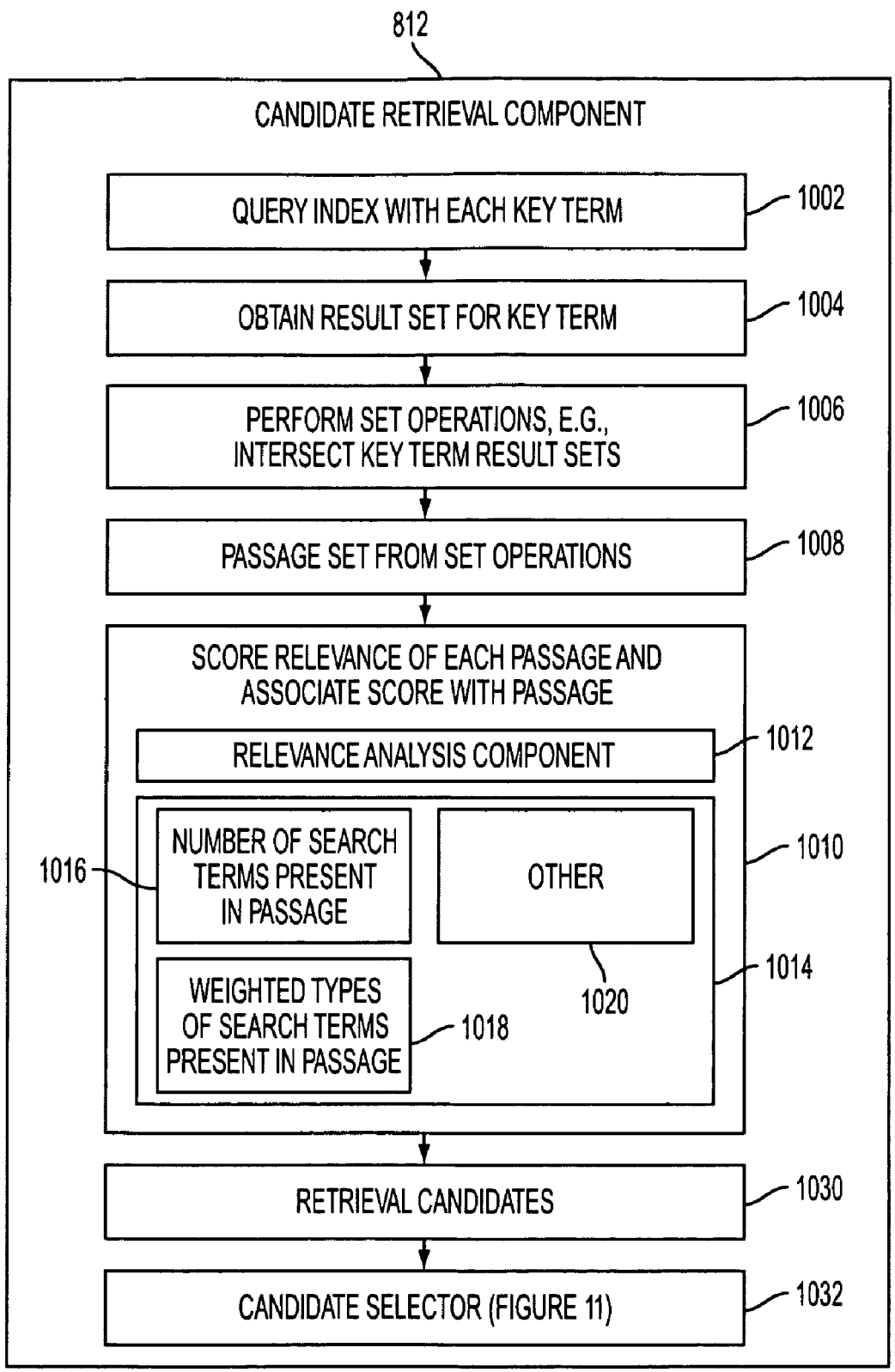
FIG. 10 is a block diagram of an exemplary candidate retrieval component.

The candidate retrieval component 812 is described in more detail with reference to FIG. 10. A record retrieval component 1002 queries the inverted index 700 (FIG. 7) for records containing, the key tokens 902-904 generated for the query 906. The key tokens 902-904 used in the retrieval may be a subset of those key terms determined by the candidate retrieval component 812 through a heuristic tuning process or as part of the iterative retrieval process. The record retrieval component 1002 returns a result set 1004 for each key term retrieved from the inverted index 700.

A logical set operations component 1006 performs logical set operations on the result set 1004 obtained for the retrieved key tokens 902-904. For example, result sets 1004 returned for two or more key tokens 902-904 may be intersected to determine the association of multiple key terms with a passage. Set operations may also be performed against any data or meta-data associated with the query key tokens 902-904 or index records 702-706 associated with the result set 1004.

The results of the set operations 1008 are used by a results scoring component 1010 to score the results obtained from the index retrieval. The results scoring component 1010 includes a relevance analysis component 1012 and a relevance rules database component 1014. The relevance analysis component 1012 applies scoring rules 1012-1016 from the relevance rules database component 1014. Part of this analysis may include drawing inferences from the results of the set operations. For example, a rule 1016 finding a plurality of query key tokens 902-904 corresponding to index key tokens 502-504 might support an inference that the passage possesses relevant semantic concepts, in relevant semantic roles, all within the same passage. Another example of a result scoring rule 1018 assigns weighted scores based upon the types of search terms that are present in each passage. For instance, a key term that represents a corresponding proper name may be weighted highly, while a key term that represents a distant hypernym may be weighted with a relatively lower score. Other rules 1020 may be added to the relevance rules database component 1014 based upon heuristics or empirical observations. A set of retrieval candidates 1030 is provided to a candidate selector 1032 for further processing.

Figure 11:
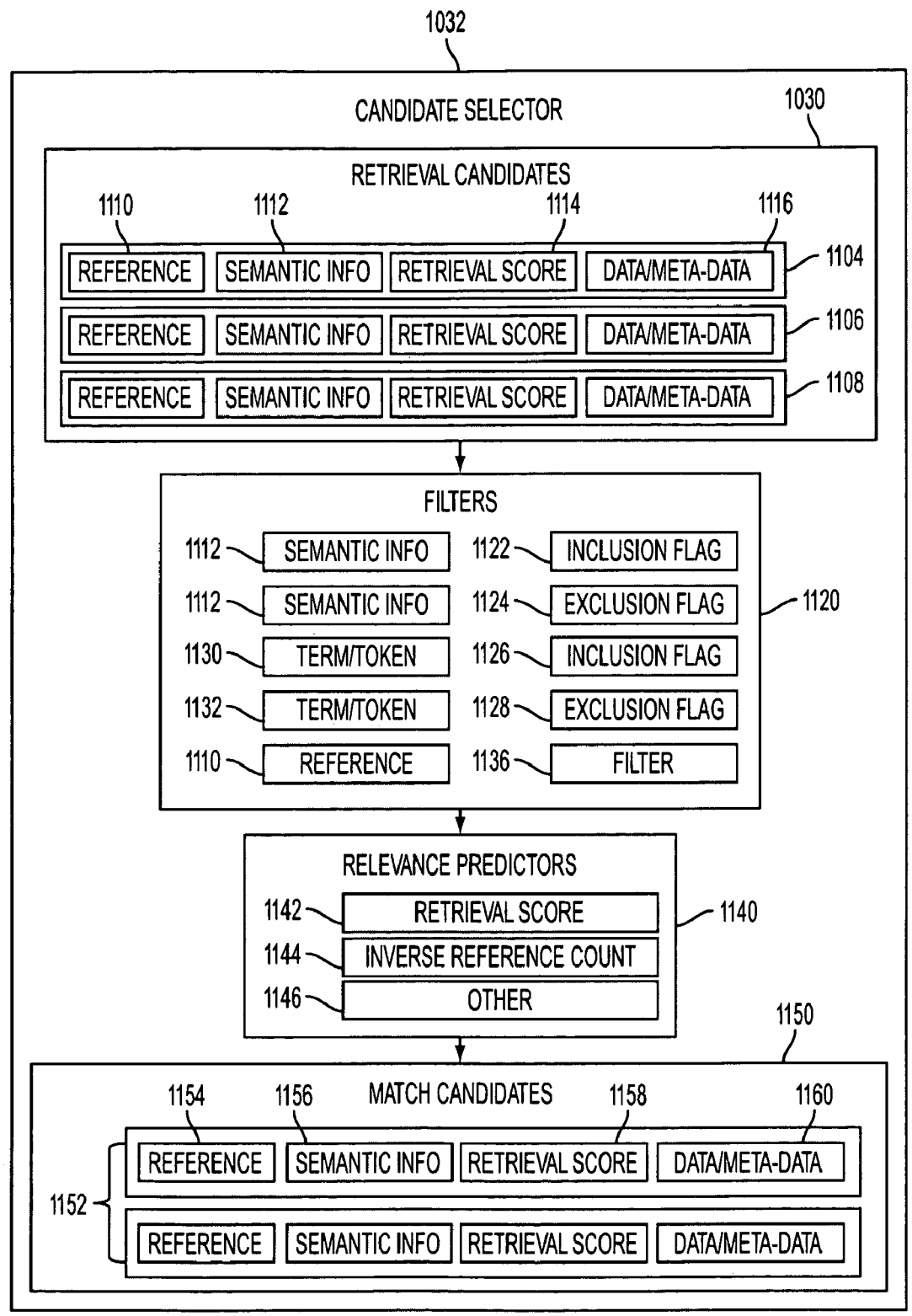
FIG. 11 is a block diagram of an exemplary candidate selector component.

The candidate selector 1032 is illustrated in more detail in FIG. 11. The set of retrieval candidates 1030 includes one or more candidates 1104-1108. A retrieval candidate 1104-1108 includes a reference 1110 and may also include other information fields 1112-1116 that may be used by the candidate retrieval component 812 to determine the potential relevance of the reference to the query. For example, a semantic information field 1112 may include information about the semantic roles of words found within the sentence and the context in which those words are found. Other useful information might include a retrieval score field 1114 that maintains the retrieval score assigned by the relevant scoring component 1010 and a data/meta-data field 1116 that could contain information such as the location of words within a passage and their proximal relation to each other. The information 1110-1116 associated with a retrieval candidate 1104 provides the basis for the operation of filters provided by a filtering component 1120. Some of the semantic information associated with the semantic information field 1112 may be specifically flagged for inclusion 1122 or exclusion 1124. For example, a term recognized as a proper name may be specifically flagged for inclusion, while a term of known irrelevant context may be specifically excluded. The filtering component 1120 may also recognized the presence 1126 or absence 1128 of specific key terms 1130-1132 (or tokens within those key terms). Other filters 1136 to determine the relevance of the passage 1110 may be added to the filtering component 1120.

Figure 13:
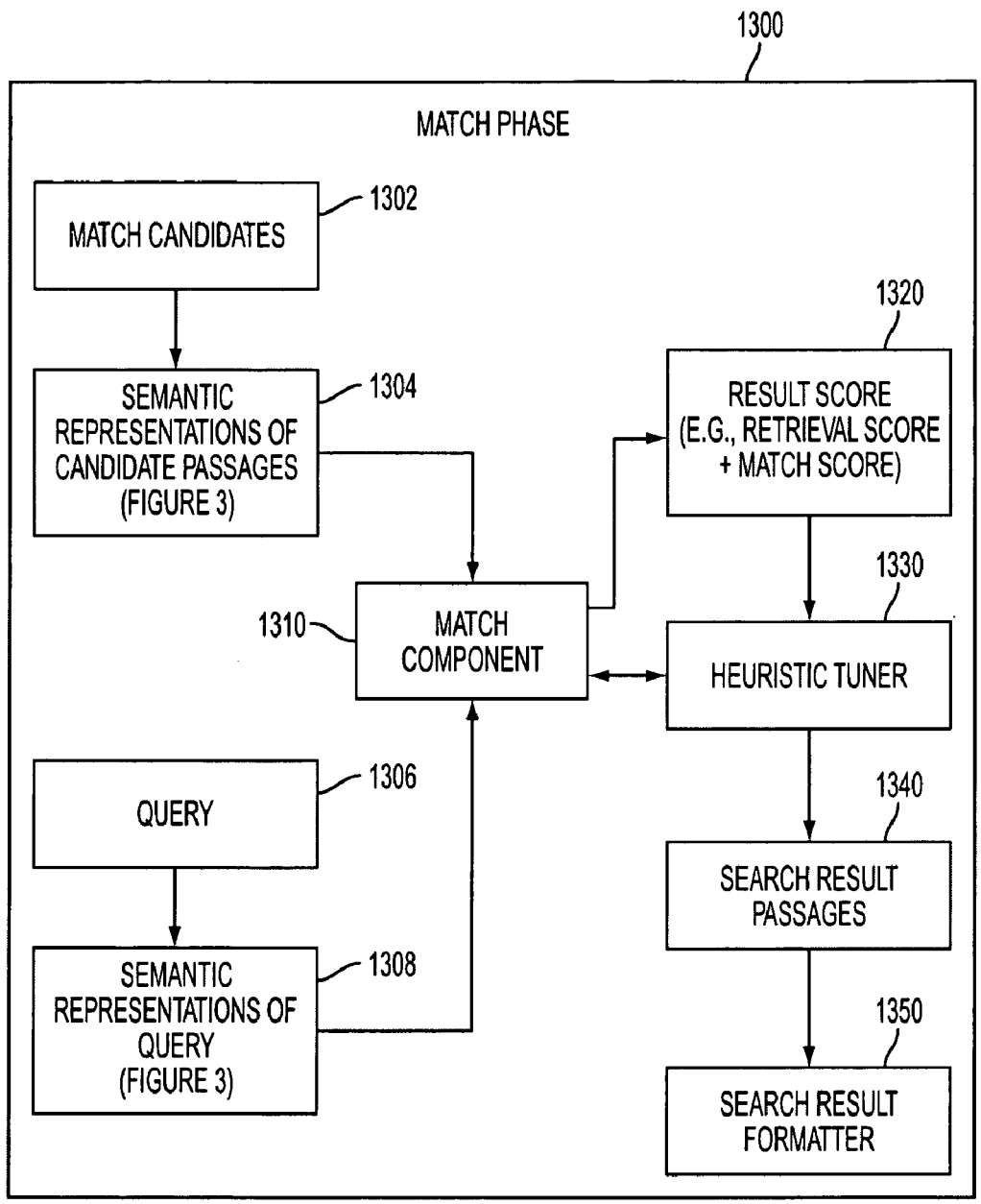
FIG. 13 is a block diagram of an exemplary match phase.

The selection of candidates to include in a match candidate set 1150 may be further subject to a relevance predictor component 1140. The relevance predictor component 1140 analyzes the retrieval scores 1142 and possibly refines the filtering of the retrieval candidates 1030 based upon heuristically tuned thresholds. The relevance predictor component 1140 may also apply conventional relevance indicators such as an inverse reference count 1144 or other empirically determined relevance predictors 1146. The candidate selector 1032 generates a set of match candidates 1150 that includes a filtered set of match candidates 1152 for a more complete, and computationally expensive, semantic match performed in the match phase (FIG. 13). Each match candidate 1150 may maintain any or all of the information 1154-1160 associated with it during the retrieval phase. For example, the retrieval score 1158 may be used as a component of a final match score.

Figure 12:
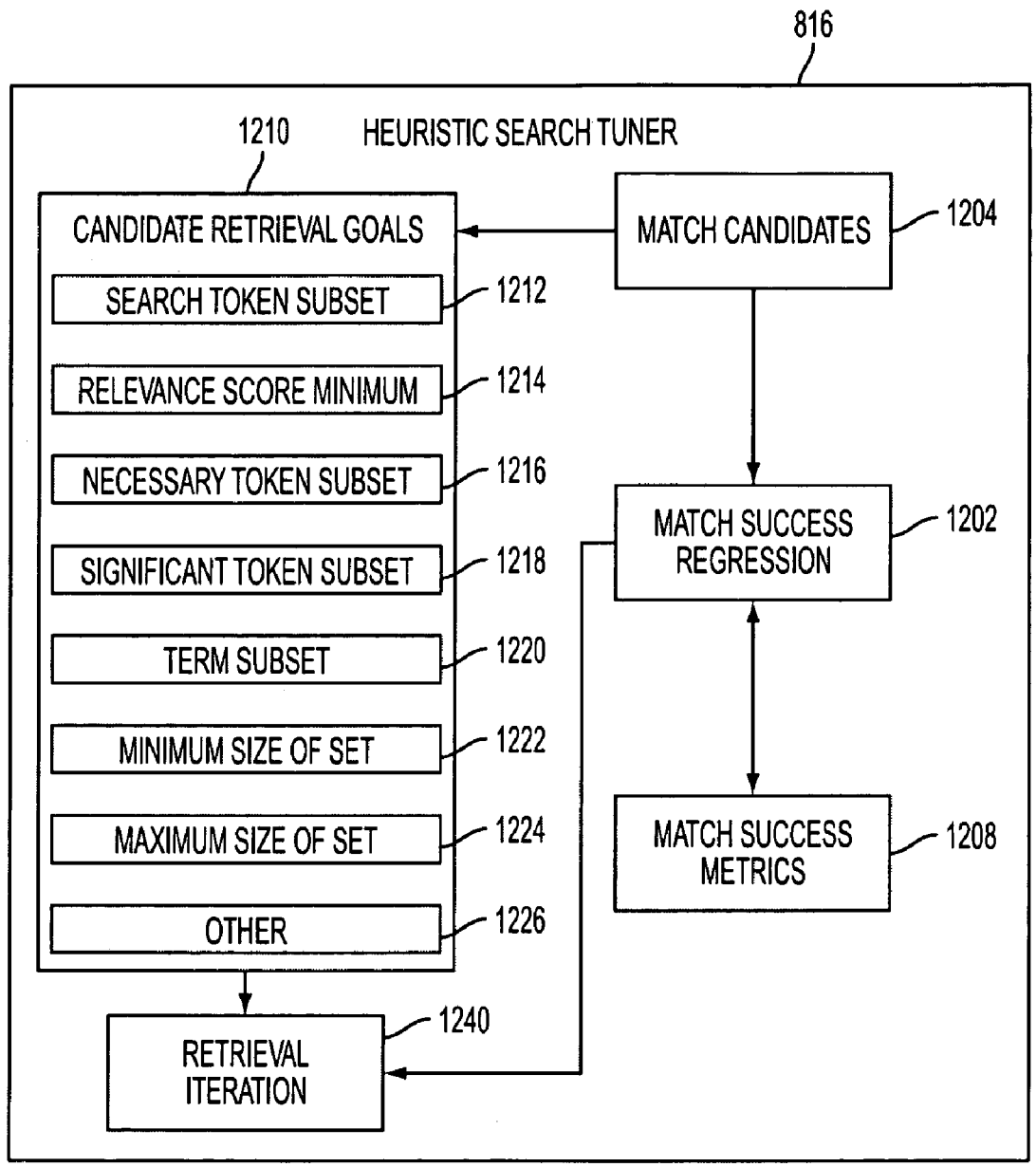
FIG. 12 is a block diagram of an exemplary heuristic search tuner.

The candidate retrieval component 812 is adjusted to improve performance over time by the heuristic retrieval tuner 816 that is shown in functional block form in FIG. 12. The heuristic tuner 816 adjusts the analysis provided by such components as the relevance score 1010 (FIG. 10), the filtering component 1120, and the relevance predictor component 1140 (FIG. 11). A match success regression component 1202 monitors and computes regressions of the success of match candidates 1204 being successfully matched in the match phase and potentially through to the search retrieval. The heuristic retreival tuner 816 maintains retrieval metrics 1208. The heuristic retrieval tuner 816 also monitors and administers a set of retrieval goals 1210. For example, the goals might include: retrieval of certain search terms 1212; minimum relevance scores 1214; the inclusion of tokens or search terms deemed necessary 1216; the inclusion of tokens or search terms deemed significant 1218; the inclusion of certain terms 1220; providing a minimum number of retrieval candidates in the set 1222; providing a maximum number of search candidates 1224; or other goals 1226. As the heuristic retrieval tuner 816 determines the success of the candidate retrieval against the search retrieval goals 1210, or the determination of the match success regression component 1202, the heuristic retrieval tuner 816 may forward the match candidate set to the match phase or alternatively triggers a retrieval iteration 1240. A retrieval iteration 1240 might progressively loosen the search criterion to retrieve a broader retrieval candidates set, as indicated by the loop 820 shown in FIG. 8.

Matching Phase

An exemplary matching phase 1300 is illustrated in functional block form in FIG. 13. During the matching phase 1300, the semantic representations 1304 generated for the match candidates 1302 are compared to the semantic representation 1308 of a query 1306 by a match component 1310. The match candidates 1302 are obtained from the retrieval phase (FIGS. 8-11). The semantic representation 1304 associated with each of the match candidates 1302 may be retrieved from the semantic representation storage 370 (FIG. 3), passed as part of the data 1116 associated with a match candidate 1152, or generated as needed by a semantic representation generator 204 (FIG. 3). Similarly, the semantic representation 1308 associated with the query 1306 may be retrieved from the semantic representation storage 370 (FIG. 3), passed from the retrieval phase (FIG. 8) or generated as needed by a semantic representation generator 204.

The match component 1310 performs matching and scoring operations between the semantic representations 1304 and 1308. These operations may include unification operations. The result of the match may be reported as a set of search result passages, a match score or other metric. A result scoring component 1320 determines a result score for each of the match candidates 1302 based upon the alignment of the semantic representations 1304 and 1308. In an embodiment, the match component 1310 generates a match score 1490, which is combined with the retrieval score 1158 to provide a result score for each of the match candidates 1302. The result scores determined by the result-scoring component 1320 are reviewed and potentially serve as input to a heuristic tuner component 1330. In an embodiment, the heuristic tuner component 1330 is a part of the same component used in the retrieval phase discussed with reference to FIG. 12. The heuristic tuner component 1330 may adjust the match component 1310 or interact with the retrieval phase, for instance, by adjusting retrieval criterion and triggering a retrieval iteration 1240. A search result component 1340 selects the search result references or passages to return in response to the query. A search result formatter 1350, may format the search result references or passages according to presentation filters. For example, references or "links" to the passages may be ordered according to result scores.

Figure 14:
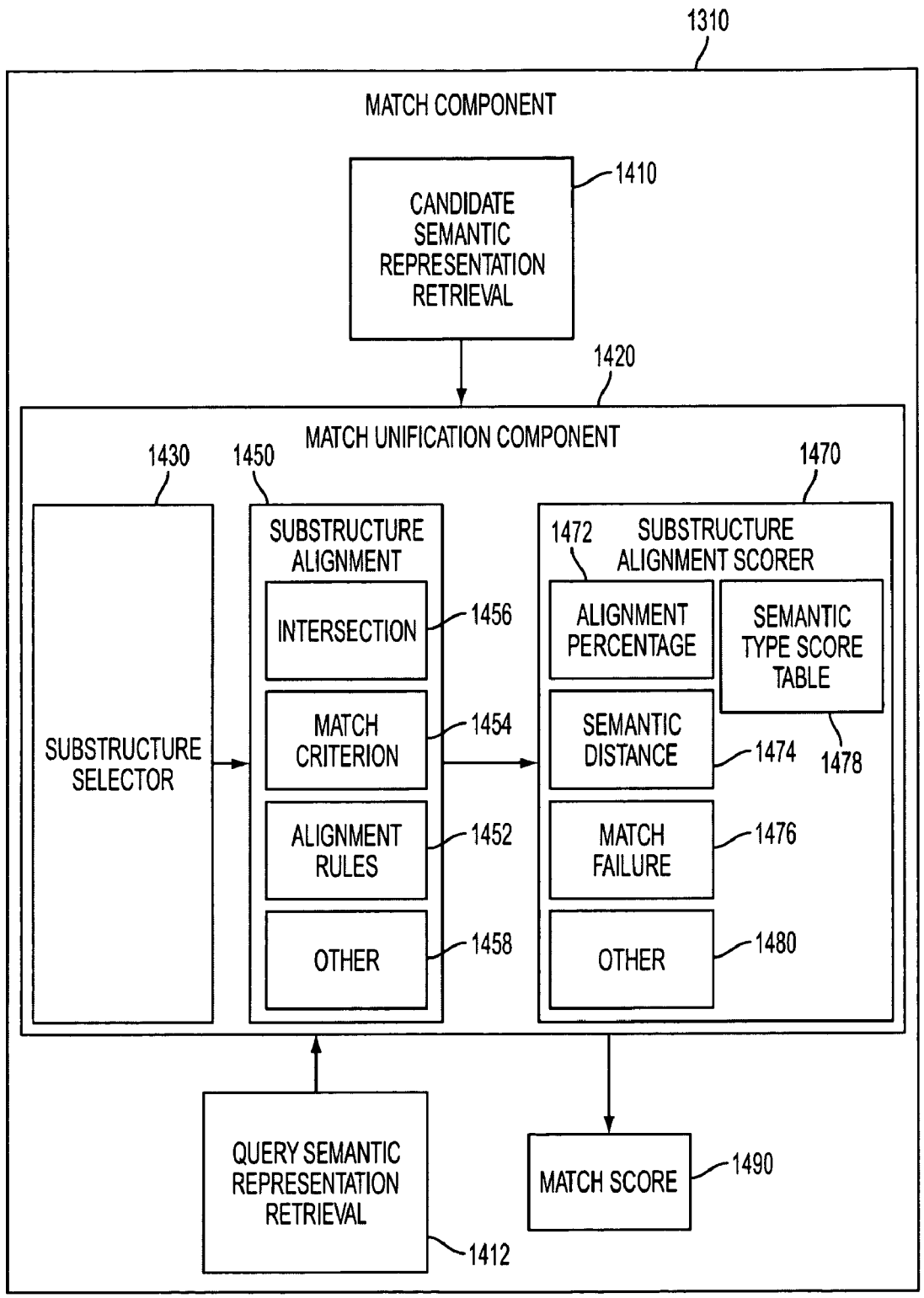
FIG. 14 is a block diagram of an exemplary match component.

Turning to FIG. 14, the match component 1310 obtains a semantic representation 1410 for each match candidate and also obtains the semantic representation of the query 1412. The match unification component 1420 includes a substructure selector component 1430 that selects from among the many substructures 332 present in a semantic representation 330 (FIG. 3). Some or all of the substructures 332 may be selected for the unification process.

A substructure alignment component 1450 applies alignment rules 1452 and match criterion 1454 to the substructures selected by the substructure selector component 1430. Generally in a unification process, a filter binds corresponding terms from each pair of predicate-argument relations that pass a matching criterion. The alignment can be as simple as an intersection 1456 or can apply other 1458 higher order analysis. For example, the matching criteria 1454 can compare string tokens or compute semantic distance by comparing ontological hierarchies associated with each terms. Certain terms, such as interrogatives, may be allowed to match freely, while other sentence forms could be discounted.

The substructure alignment component 1450 provides the alignment results to a substructure alignment scorer 1470. The substructure alignment scorer 1470 applies scoring criterion 1472-1480 to the match results. For example, the percentage of substructures that align 1472 may indicate a proportional score, while a particularly high score may be assigned to a unique binding of all terms in all relations from the query semantic representation with the corresponding terms in the same relations from the passage semantic relations. A semantic distance computation 1474 may assign higher scores to relationships that are closer than to those that are more distant. A failure to match computation 1476 could decrease scores based on the absence of terms or semantic relationships.

The alignment of certain types of semantic terms or relationships may also be assigned. For instance, drawing from a semantic type score table 1478, a scoring component might rates a close synonym of a noun in the subject role as a more reliable indicator of relevance than a distant hypernym of a noun in the object role. The values and relationships associated with the semantic type score table 1478 may be stored in a separate database in order to enable empirically-based tuning of the match scores. Other scoring computations 1480 are possible. Methods and systems for match unification and scoring are further described in Crouch, referenced above and incorporated herein. The match component 1310 produces a match score 1480 to indicate the relative success of the matching process.

Various of the above-disclosed and other features and functions, or alternatives thereof, may be desirably combined into many other different systems or applications. While the methods and the systems have been illustrated in many cases using functional block or flow diagrams to provide a clear description of reasonable length, it should be noted that these diagrams may unnecessarily imply that what is described is sequential in nature. Many times, however, the actual sequence is unimportant. For the sake of brevity, all permutations possible for minor implementation details are not described, but are fully intended to be included in the spirit in scope of the description of the specification. Further, the claims can encompass embodiments in hardware, software, or a combination thereof. Various presently unforeseen or unanticipated alternatives, modifications, variations, or improvements therein may be subsequently made by those skilled in the art, which are also intended to be encompassed by the following claims.

What is claimed is:

1. A method for information search, comprising the steps of:
    generating one or more semantic index key terms each including at least one semantic index token representing a semantic relationship, comprising:
        selecting a word and at least one further word that is linguistically related to the word from one or more references to information passages;
        determining information regarding use of the word and the further word within at least one of the references comprising one or more of a part of speech and a grammatical role of the word or the further word; and
        concatenating each of the word and the further word with the respective information into a single string as the semantic index key terms;
    associating each of the semantic index key terms with the at least one reference; and
    generating an inverted index comprising the semantic index key terms indexed against the at least one reference to each associated information passage, wherein the steps are performed on a suitably programmed computer.

2. The method of claim 1, further comprising:
    obtaining a search query;
    generating a semantic query key term including at least one semantic query token representing a semantic relationship derived from the search query;
    querying the inverted index with the semantic query key term; and
    receiving a set of references to information passages associated with the semantic query key term that corresponds to the semantic index key term indexed by the inverted index.

3. The method of claim 2, further comprising:
    obtaining a semantic representation of the information passage, the semantic representation of the information passage comprising one or more semantic the substructures, each semantic substructure comprising at least one predicate-argument relation;
    generating the semantic index token from at least one of the semantic substructures; and
    generating the semantic index key term including the semantic index token.

4. The method of claim 3, further comprising:
    obtaining a semantic representation of the search query, the semantic representation of the search query comprising one or more semantic substructures, wherein each semantic substructure comprises at least one predicate-argument relation;
    generating the semantic query token based upon at least one of the semantic substructures for the search query; and
    generating the semantic query key term comprising at least one semantic query token.

5. The method of claim 4, further comprising:

determining a set of candidate information passages from the set of references to information passages;

matching the semantic representation of the information passage with the semantic representation of the search query for at least one member of the set of candidate information passages to generate a match result;

generating a filtered search result set by filtering the set of candidate information passages based at least in part upon the match result; and returning the filtered search result set.

6. The method of claim 5, wherein determining the set of candidate information passages further comprises:

determining a retrieval weight for the at least one semantic query token; and selecting members of the set of candidate information passages based at least in part on the retrieval weights assigned to the semantic query tokens.

7. The method of claim 6, further comprising:

heuristically tuning the retrieval weights assigned to the semantic query tokens.

8. The method of claim 6, further comprising:

associating a token type with the at least one semantic query token; and assigning the retrieval weight based at least in part upon the token type.

9. The method of claim 6, further comprising:

heuristically tuning the determination of the set of candidate information passages.

10. A computer-readable media including program instructions for performing a method, comprising the steps of:

generating one or more semantic index key terms each including at least one key token representing a semantic relationship, comprising:

selecting a word and at least one further word that is linguistically related to the word from one or more references to information passages;

determining information regarding use of the word and the further word within at least one of the references comprising one or more of a part of speech and a grammatical role of the word or the further word; and concatenating each of the word and the further word with the respective information into a single string as the semantic index key terms;

associating each of the semantic index key terms with the at least one reference; and generating an inverted index comprising the semantic index key terms indexed against the at least one reference to the associated information passages, wherein the steps are performed by a central processing unit.

11. A computer-readable media including program instructions for performing a method, comprising the steps of:

obtaining a search query;

generating one or more semantic query key terms each including at least one semantic query token representing a semantic relationship derived from the search query, comprising:

selecting a word and at least one further word that is linguistically related to the word from the search query;

determining information regarding use of the word and the further word within the search query comprising one or more of a part of speech and a grammatical role; and concatenating each of the word and the further word with the respective information into a single string as the semantic index key terms;

accessing an inverted index comprising at least one semantic index key term indexed against at least one of the references;

querying the inverted index with the semantic query key term; and receiving a set of references to information passages associated with the semantic query key term that corresponds to the semantic index key term indexed by the inverted index, wherein the steps are performed by a central processing unit.

12. The computer-readable media of claim 11, further comprising program instructions for:

determining a set of candidate passages from the set of references to information passages associated with the semantic query key term obtained from the inverted index, comprising:

determining a relevance score for at least one semantic query token matching a semantic index token; and filtering the set of candidate information passages based at least in part upon the relevance score; and returning the filtered set of candidate information passages as a set of match candidates.

13. The computer-readable media of claim 12, further comprising program instructions for:

obtaining a semantic representation of the search query, the semantic representation of the search query comprising at least one semantic substructure;

generating a semantic query token from the at least one semantic substructure;

associating the semantic query token with the semantic query key term;

obtaining a semantic representation of the information passage, the semantic representation of the information passage comprising at least one semantic substructure;

matching the semantic representation of the information passage with the semantic representation of the search query for at least one of the match candidates;

filtering the match candidates based at least in part upon the results of the matching; and returning the filtered set of match candidates as a search result set.

* * * * *